May 12, 1959 — A. C. HOWARD — 2,886,116
ROTARY CULTIVATING APPARATUS
Filed Feb. 13, 1956 — 2 Sheets-Sheet 1

May 12, 1959  A. C. HOWARD  2,886,116
ROTARY CULTIVATING APPARATUS
Filed Feb. 13, 1956  2 Sheets-Sheet 2

Уnited States Patent Office 2,886,116
Patented May 12, 1959

2,886,116

ROTARY CULTIVATING APPARATUS

Arthur Clifford Howard, West Horndon, England, assignor to Rotary Hoes Limited, West Horndon, England Application February 13, 1956, Serial No. 565,241

Claims priority, application Great Britain February 19, 1955

1 Claim. (Cl. 172—464)

The invention relates to a rotary-cultivating apparatus of the kind to be towed, through a universal connection, by a tractor, and the main object is to provide such an apparatus with a simple means of enabling the depth of cultivation to be adjusted.

According to the invention, the apparatus includes a carriage having a pair of coaxial ground-engaging wheels adjacent the rear and having, at the front, an element of a universal towing hitch for connection to a coacting element carried by the tractor, the carriage rearwardly of the ground-engaging wheels pivotally supporting, on a transverse axis, a rotary-cultivating implement, and the latter and the carriage, remotely from the pivotal support, being interconnected by means for orientating the implement about the pivotal support whereby to adjust the depth of cultivation.

The implement can have fast with a frame member thereof a pair of forwardly-extending, parallel arms which, at their forward ends, are pivotally connected on aligned transverse axes to respective, rearwardly-extending arms at each lateral side of the rear of the carriage whereby to provide the pivotal support of the implement from the carriage. By arranging for these arms to lie between the pair of ground-engaging wheels, the latter can be laterally-outwardly of the implement structure and be made of any desired diameter, for example, for ensuring that the line of thrust between a driven earth-working rotor of the implement and the towing hitch connection to the tractor shall have a desired relationship to the position of the pivotal support for the implement from the carriage.

In the case where an earth-working rotor of the implement is to be driven from a power take-off of the tractor, the rotor, according to a further feature, if driven from a telescopic transmission shaft (i.e., for enabling the rotor to be driven when set for different depths of cultivation), arranged longitudinally of the carriage, having at its rear a universally-jointed connection to an input shaft of the implement and, at its front, a universally-jointed connection to the rear of a driven shaft which, in turn, has a universally-jointed connection at the front to a shaft, of the tractor, driven from the power take-off, the front of the telescopic shaft being supported in a bearing suspended from a pedestal which is supported, for fore-and-aft tilting, from the carriage whereby to permit the displacement of the universally-jointed connection between the telescopic and driven shafts when the carriage rises and falls by passing over uneven ground, or when the carriage and tractor hinge laterally during steering.

Preferably this pedestal provides alternative points of suspension for the bearing so as to enable the height of the front of the telescopic shaft to be adjusted to suit the height of the driven shaft of the tractor to be used.

In the accompanying drawings:

Figure 1 is a part-sectional side elevation of one form of apparatus according to the invention;

Figures 2 and 3, respectively, are enlarged sectional views on the lines 2—2 and 3—3 of Figure 1;

Figure 1:
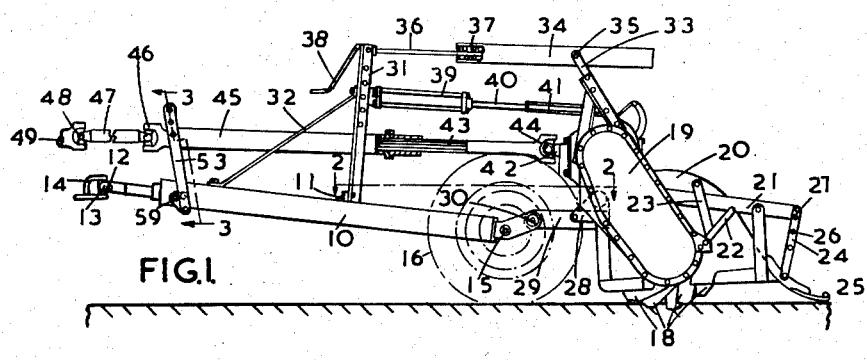

Referring to the drawings, the carriage includes two side frame members 10, 10 which converge to the front and are elsewhere interconnected by a transverse stay 11. The frame is thus substantially of A shape in plan and, at its apex, it has one element 12, of a universal towing hitch, which is pivoted on a horizontal axis to the coacting element 13 which, in turn, is pivoted on a vertical axis from a bracket 14 fast with the tractor (not shown). Rearwardly of the stay 11, a shaft 15, for a pair of coaxial ground-engaging wheels 16 is suitably journalled in respective pairs of rearward extensions 17, 17 of the members 10. As shown, these extensions are formed separately and welded to the members 11.

The implement shown in Figure 1 is a rotary cultivator of which some of the rotor blades are indicated at 18, the rotor being driven, through a chain and sprocket drive contained within a casing 19, in a manner hereinafter described. The casing 19 and a curved shield 20 for the rotor are fast with a frame of the implement, and the frame also supports a pair of rearwardly-extending arms 21 which are stayed from the frame and cover at 22, 23 and have at their reaward ends a link 24 by which a depth-controlling tailboard 25 can be held in an adjusted position. This tailboard is pivoted on a horizontal axis from the cover 20, and the link 24 has a series of holes 26 for alternative engagement by a bolt 27 securing the link to the arm 21. This depth-controlling feature does not form part of the present invention, but is the subject of our copending U.S. application No. 552,349, filed December 12, 1955.

The front of the implement frame has a pair of forwardly-extending brackets 28 which provide anchorages for respective arms 29, and the forward extremities of these latter are pivoted at 30 from the arms 17, 17. The whole implement can therefore pivot about the axis 30 relatively to the carriage.

In an intermediate position (e.g., in the vicinity of the transverse stay 11, as shown) the carriage supports a stanchion 31 suitably stayed from the apex of the frame as at 32. Between the head of the stanchion and an upwardly-extending arm 33 fast with the implement frame is arranged a telescopic member incorporating a compression spring which absorbs part of the moment of the implement. This telescopic member is shown in Figure 1 as comprising a cylinder 34 having a trunnion connection 35 with the arm 33 and containing a non-rotatable nut (not shown in Figure 1) working on a screw-threaded portion of a rod 36 which extends through a trunnion block supported at the head of the stanchion. A compression spring 37 reacts between the nut and an end of the cylinder 34.

A hydraulic ram cylinder 39 has one end pivoted from the stanchion 31, and its piston rod 40 has a slotted member 41 engaged over a pin fast with the arm 33. Thus, with the crank handle 38 turned for setting the rotor at a desired depth for cultivation, the whole implement can be raised, and again lowered for operation at the same depth, the trunnion at the head of the stanchion being such that the rod 36 will slide freely through it in these conditions.

The implement has a forwardly-extending input shaft 42 for driving the input sprocket in the casing 19 through a transmission means (not shown), and one element 43 of a telescopic transmission shaft is secured to the front of the shaft 42 by a universal joint 44. The opposite end of the coacting element 45 of the telescopic shaft is connected by a second universal joint 46 to the rear of a driven shaft 47 having its front connected by a third universal joint 48 to a shaft 49 driven from the tractor power take-off.

Figures 3, 4:
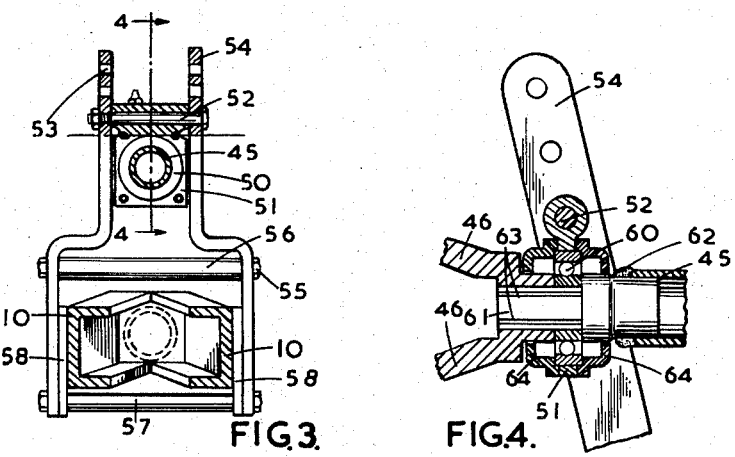
Figure 4 is a section on the line 4—4 of Figure 3 and drawn to a larger scale than the latter.
Figure 2:
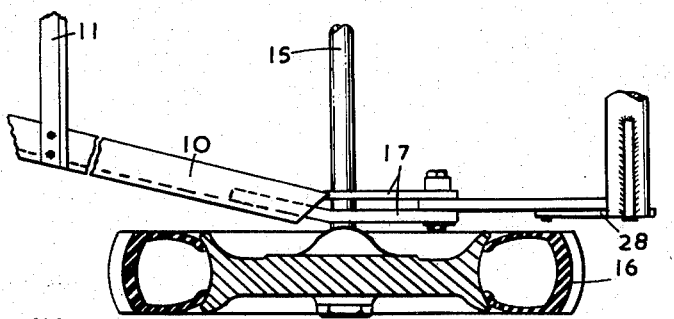
Figure 8:
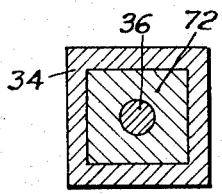
Figure 8 is a section on the line 8—8 of Figure 7.

The front of the telescopic shaft portion 45 is supported in a bearing 50 arranged in a hanger 51 which is suspended from a pivot bolt 52 uniting the two parts 53, 54 of a stanchion pivotally supported from the carriage. The parts 53, 54 have alternative holes for engagement by the bolt 52 so that the height of the shaft portion 45 can be adjusted to suit the height of the shaft 49 of the tractor with which the carriage is to be used. The parts 53 and 54 are outwardly cranked as shown in Figure 3 and interconnected by a bolt 55 extending through a distance tube 56. At their lower extremities the parts 53, 54 are interconnected by a bolt 57 which is pivotally supported in brackets 58 bolted at 59 to the appropriate frame members 10. The hanger, as shown in Figure 4, contains a bearing 60 for a stub shaft 61 which is welded at 62 in the shaft portion 45 and splined at 63 in the adjacent element of the universal joint 46. A pair of dust covers are shown at 64.

It will be seen that when the universal joint 46 is displaced consequent on a steering movement of the tractor, or when the carriage rides over a hump or hollow of the ground, the effective length of the telescopic shaft 43, 45 becomes automatically adjusted and the pivoted stanchion 53, 54 can tilt about its pivot 57 for accommodating the displacement.

Figure 5:
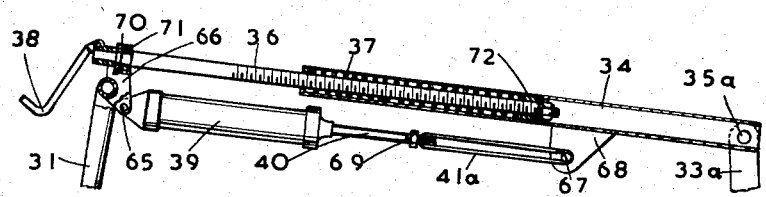
Figures 5 and 6 are part-sectional side elevations respectively of two modified lifting arrangements for the implement.

In the construction shown in Figure 5, the ram cylinder 39 is pivoted at 65 from the trunnion block, shown at 66, at the head of the stanchion 31, and the slot of the slotted member 41a coacts with a pin 67 of a bracket 68 fast with the cylinder 34, the rear of which has a trunnion connection 35a with the head of an arm 33a fast with the implement frame. The figure also shows details which are too small to be seen in Figure 1, and of these it will be seen that the member 41a (or 41, as appropriate) has a screw-threaded connection at 69 with the piston rod 40, and that the rod 36 has an abutment 70 which bears against a thrust bearing 71 (through which it can slide when the implement is raised hydraulically) mounted on the trunnion block. The nut with which the screw-threaded portion of the rod 36 coacts is shown at 72, and if the cylinder 34 be of rectangular cross-section the nut can be of equivalent shape.

Figure 6:
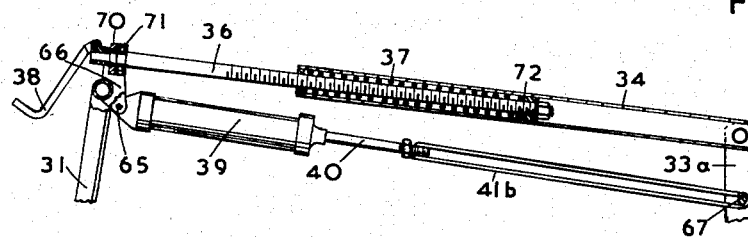

The construction shown in Figure 6 differs from that in Figure 5 in that instead of the pin 67 being on a bracket attached to the cylinder 34 it is on the arm 33, and the slot of the member 41b is made apppropriately larger.

Figure 9:
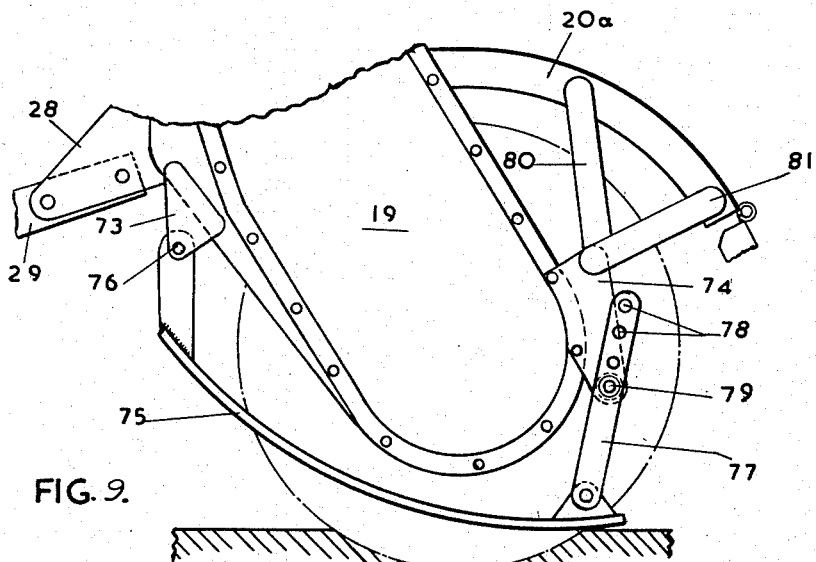
Figure 9 illustrates a modified depth control means.
Figure 7:
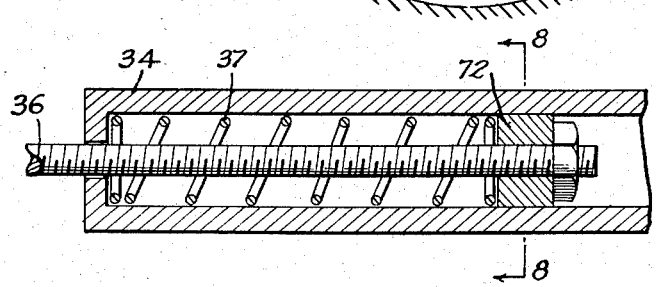
Figure 7 is an enlarged detail of a portion of Figures 5 and 6.

In Figure 9 a different depth control means is shown. Thus, instead of the pivoted tailboard 25 of Figure 1, the implement frame has brackets 73, 74 between which a depth-control skid 75 is supported. The leading end of the skid is pivotally supported at 76 from the bracket 73, while its trailing end has a pivoted link 77 with a series of holes 78 for selective attachment by a bolt 79 to the bracket 74, whereby the effective height of the skid can be adjusted. The figure also shows stays 80, 81 from the bracket 74 for the rotor shield 20a.

What I claim as my invention and desire to secure by Letters Patent of the United States is:

A rotary-cultivating apparatus, to be towed behind a tractor, comprising a rigid carriage, a pair of coaxial ground-engaging wheels adjacent the rear of said carriage for supporting the same, said wheels journalled from said carriage on an axis which is stationary relatively to said carriage, an element of a universal towing hitch at the front of said carriage, said element for connection to a coacting element carried by the tractor, a rotary-cultivating implement, a pivotal connection between said implement and said carriage, said pivotal connection having its axis transverse to said carriage, an arm fast with said implement, a stanchion fast with said carriage, and a resiliently-extensible means interconnecting said arm and stanchion to support part of the weight of said implement, said resiliently-extensible means incorporating coacting screw-threaded elements which can be turned manually for adjusting the overall length of said resiliently-extensible means for orientating said implement about said pivotal connection so as to adjust the depth of operation of said implement and to regulate the proportion of the weight of said implement to be supported, said resiliently-extensible means coacting with an abutment of said stanchion to support the implement, and a hydraulic piston and cylinder arrangement interconnecting said stanchion and a part attached to said implement for raising the latter clear of the ground, said resiliently-extensible means disengaging said abutment as said piston and cylinder arrangement operates to raise said implement and re-engaging said abutment when said arrangement is reversely operated whereby said implement is lowered to the same position from which it was raised.

References Cited in the file of this patent

UNITED STATES PATENTS

| | | |
|---|---|---|
| 1,504,495 | Patitz | Aug. 12, 1924 |
| 2,214,702 | Seaman | Sept. 10, 1940 |
| 2,473,770 | Seaman | June 21, 1949 |
| 2,506,054 | Agee et al. | May 2, 1950 |
| 2,704,018 | Oehler et al. | Mar. 15, 1955 |
| 2,737,868 | Morkoski | Mar. 13, 1956 |